ROTATING ELECTRICAL CONNECTOR FOR ARMORED CORD

Filed Aug. 13, 1964 2 Sheets-Sheet 1

INVENTORS E. R. COCCO
V. S. MARTIN
BY E. J. Olinder
ATTORNEY

ROTATING ELECTRICAL CONNECTOR FOR ARMORED CORD

Filed Aug. 13, 1964

United States Patent Office 3,321,728
Patented May 23, 1967

3,321,728
ROTATING ELECTRICAL CONNECTOR FOR ARMORED CORD

Eugene R. Cocco, Baltimore, and Victor S. Martin, Lutherville, Md., assignors to Bell Telephone Laboratories, Incorporated, New York, N.Y., a corporation of New York Filed Aug. 13, 1964, Ser. No. 389,440
4 Claims. (Cl. 339—8)

This invention relates to telephone sets and more particularly to a rotating connector for use with flexible armored cord on coin telephones.

The electric cord which connects a telephone handset with its base or other mounting is subjected in use to repeated twisting and pulling. This problem is especially acute with public coin telephones because of their relatively high usage rate, the lesser degree of care accorded them by the general public and their susceptibility to acts of vandalism. Repeated twisting shortens and ultimately breaks the handset cord which then must be replaced at some cost. In addition, acts of vandalism such as intentional pulling or tearing of the cord can result in damage to the cord and its anchoring. Introduction of anchored flexible armor to protect the electrical cord has given some protection against vandalism and hard usage, but has not eliminated the problems resulting from twisting.

Accordingly, an object of the invention is to minimize and remove twisting in armored cord used in coin telephones, while maintaining electrical continuity between the telephone handset cord and the apparatus in the housing.

Another object of the invention is to improve the anchoring of armored cord in coin telephones to enable the cord to withstand a large tensile pull.

A further object of the invention is to reduce the susceptibility of flexible armored cord and its anchoring to acts of vandalism.

These and other objects are achieved in accordance with the principles of the invention by a rotating connector that turns in response to twists placed in the armored cord through usage and that anchors securely in the telephone station housing.

In accordance with the invention, a first member is fixedly mounted within a telephone housing and a second member is rotatably mounted within the first member in a running fit. The rotating member attaches to the armor of the electric cord thereby to anchor it in the housing, and includes several spaced rings that are contacted by corresponding spring contacts. The handset cord conductors attach to the rings while the spring contacts are connected to the telephone line circuitry. The electrical connections between the handset and the line circuitry are maintained regardless of the amount that the rotating member is turned. The twists placed in the handset cord, either intentionally or through routine usage, are translated into a torque on the armored cable which periodically turns the rotating member, thereby removing the twist. Excessive twists cannot accumulate, due to the combined effect of rotating connector and the armored cord. In accordance with the invention the mounting member and the rotating member are advantageously made of a suitable plastic material so that the bearing surfaces are strong yet require no lubrication.

A feature of the invention, therefore, resides in a plastic rotating connector device rotatably anchored in a plastic mounting, which maintains contact between the conductors of a telephone handset and those of the line circuitry.

An additional feature of the invention resides in the anchoring of an armored cord to a rotating connector that can withstand an unusually large tensile pull without rupturing.

These and other objects and features of the invention will be clearly apprehended from the following detailed description of an illustrative embodiment of the invention and of the appended drawings in which:

FIG. 1 illustrates cord twisting that generally occurs to the armored cord of a public telephone station, and that if not checked will render the telephone inoperative.

Figures 1, 3, 4:
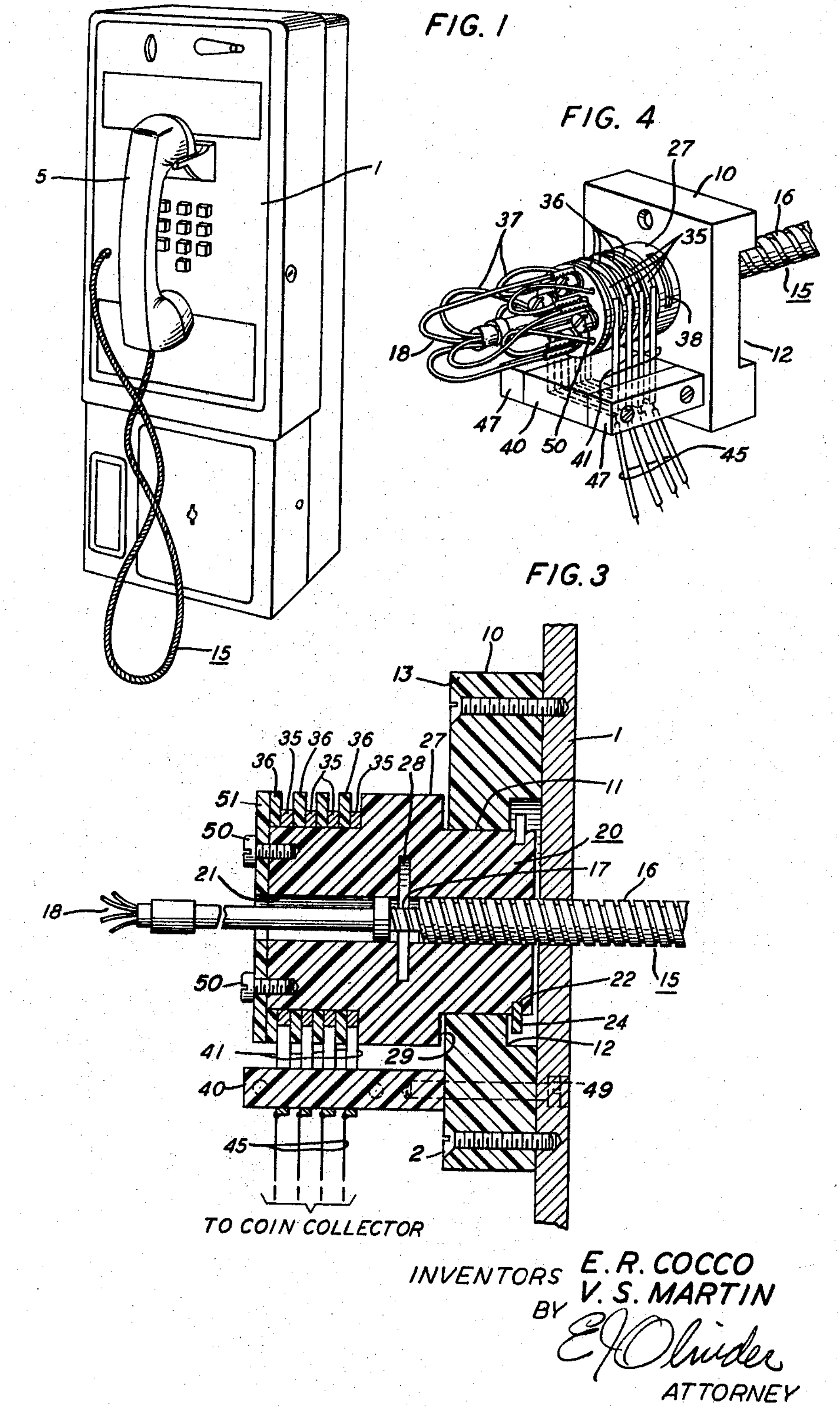
FIG. 1 is an illustration of an armored cord that has been twisted in use.
FIG. 3 is a partial sectional side view of the connector.
FIG. 4 is a perspective view showing the connector and the mounting.
Figure 2:
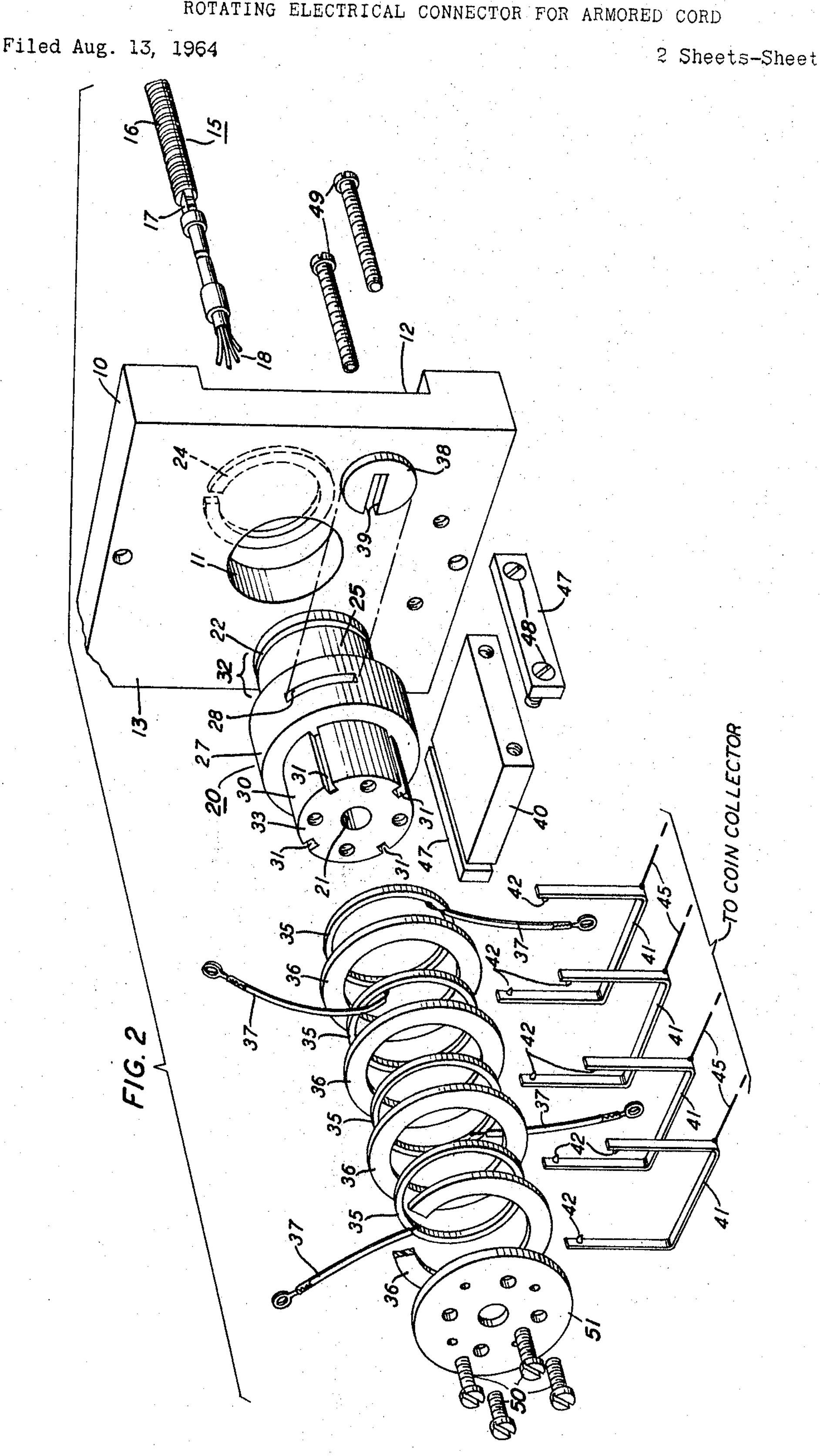
FIG. 2 is an expanded view showing the rotating connector.

FIGS. 2 and 3 shows the inside surface of a telephone housing to which a plastic base plate 10 is secured by such means as machine screws 2. Plate 10 includes a cylindrical hole 11 that is a bearing surface for end portion 32 of rotating member 20. Member 20 includes cylindrical shoulder 30, a midportion flange 27 and end portion 32. Shoulder 30 includes a plurality of spaced axial grooves 31, and supports a plurality of conductive collector rings 35 insulated and spaced from one another by insulation spacer 36. Each ring 35 has a lead 37 that fits in a respective one of grooves 31 and is set back from the end 33 of shoulder 30 for connection to cord structures to be described. End portion 32 includes a bearing surface 25 and shoulder 29 which cooperate in a running fit with the hole 11 and the face 13 of base plate 10, thereby to provide a plastic-on-plastic thrust and rotational bearing surface in accordance with the invention, and to eliminate need for lubricants. Shoulder 29 is integral with member 20 and acts as an anchor that resists any tensile pulls resulting from strains placed upon armored cord 15. Member 20 includes axial passage 21 which receives and houses armored cord 15 and which leads conductors 18 through the member so that they may be connected as shown in FIG. 4 by means such as screws 50 and end plate 51 to respective ones of leads 37.

Flange 27 of member 20 includes a slot 28 through which cord retainer 38 having key-way 39 may be inserted to lock cord 15 securely to the member 20 by gripping a crimp 17 in cord 15's end portion.

A retainer ring 24 shown in FIG. 3 fastens in a keyway 22 of housing end portion 32 and butts against face 12 of plate 10 to prevent member 20 from being pushed away from base plate 10 by inward forces occasionally acting on armored cord 15.

As seen best in FIG. 4, the rings 35 are contacted by a plurality of contact springs 41 which may be U-shaped, as shown, to provide dual contact surfaces such as cones 42 as shown. These cones may be gold-plated to insure a low-noise, long life electrical connection. Springs 41 are held on a platform 40 secured to base plate 10 by the gripping action of two spring holders 47. The latter fasten to platform 40 by suitable means such as screws 48; and platform 40 is fastened to base 10 by screws 49. Each spring 41 has a lead 45 which connects with the circuitry of the telephone station( not shown).

In accordance with the invention, any twisting of the armored cord such as indicated by the arrow in FIG. 5 will be eliminated by the rotation of member 20 within the base plate 10. During whatever rotation occurs, electrical continuity is maintained between the conductors 18 of the telephone handset cord and the leads 45 to the telephone circuitry by the action of contact springs 41 and rings 35. Further, in accordance with the invention, tensile forces of considerable size can be placed on the member 20 through pulling on armored cord 15, without damaging or disturbing any contacting of rings 35 by the springs 41.

In accordance, therefore, with the invention as illustrated in the illustrative embodiment described, a very small number of inexpensive, strong, light-weight plastic and metal parts have been employed to produce a rotating connector that reduces and eliminates twists in armored telephone cord periodically and that offers very strong resistance to tensile pulls in the cord.

Persons skilled in the art may, of course, design numerous embodiments without departing from the spirit and scope of the invention.

What is claimed is:

1. Apparatus for effecting rotatable electrical connections between the conductors of an electrical cord leading to a fixed housing and a like plurality of conductors within said housing, said apparatus comprising: an insulative rotatable element comprising first and second cylindrical end shoulders and a raised midportion flange, said first end shoulder defining a rotational bearing surface and the adjacent said midportion flange defining a thrust bearing surface, said rotatable element further comprising an axial passage; a plurality of spaced conductive rings mounted on said second end shoulder; an electrical cord passing through said housing and disposed in said axial passage; means for anchoring said cord internally in said rotatable element; means for connecting individual conductors in said cord with respective ones of said annular rings; bearing means fixed in said housing interior for receiving the rotational and the thrust bearing surfaces of said rotatable element, whereby a pull on said cord draws said thrust bearing surface against said bearing means, and a twist of said cord causes said rotational bearing surface to rotate within said bearing means; and a plurality of arms mounted within said housing and connected to said like plurality of conductors for effecting electrical contact with respective ones of said rings.

2. Apparatus in accordance with claim 1 wherein said electrical cord further comprises an armored exterior jacket; and the means for anchoring said cord comprises a radial slot in said rotatable element reaching to said axial passage, and an insertable member including a key-way for placement into said slot, said key-way impinging upon the precrimped portion of said armored jacket, thereby to secure said jacket in said element.

3 Apparatus in accordance with claim 1 wherein said second end shoulder further comprises a plurality of spaced axial grooves; and wherein said connecting means comprises a conductive lead connected to each said annular ring and disposed in a respective one of said grooves, each said lead being connected to one of said conductors in said cord.

4. Apparatus in accordance with claim 1 wherein said bearing means comprises an insulative plate fixably mounted on an interior surface of said housing, said plate including rotational and thrust bearing surfaces for receiving the corresponding bearing surfaces of said rotatable element, said plate further comprising means for mounting said arms, and both said plate and said rotational element being comprised of a plastic material having a self-lubricating property.

References Cited by the Examiner

UNITED STATES PATENTS

| | | | |
|---|---|---|---|
| 2,436,949 | 3/1948 | Anderson | 339—5 |
| 2,459,032 | 1/1949 | Korth | 339—8 |
| 3,238,491 | 3/1966 | Rogers | 339—8 |

FOREIGN PATENTS

| | | |
|---|---|---|
| 326,158 | 3/1930 | Great Britain. |
| 355,862 | 9/1931 | Great Britain. |
| 213,330 | 5/1941 | Switzerland. |

MARVIN A. CHAMPION, *Primary Examiner.*

ALFRED S. TRASK, *Examiner.*